United States Patent Office 3,392,029
Patented July 9, 1968

3,392,029
PROCESS FOR COATING RICE
Roger G. Nibler and Arnold S. Roseman, Glenview, Ill., assignors to National Dairy Products Corporation, New York, N.Y., a corporation of Delaware
No Drawing. Filed Sept. 23, 1964, Ser. No. 398,763
9 Claims. (Cl. 99—83)

ABSTRACT OF THE DISCLOSURE

Substantially dry rice mixed with water to increase the surface moisture thereof from about 5 to 20% by weight, a substantially dry coating applied to said rice, followed by drying.

The present invention relates generally to rice and, more particularly, it relates to a method for combining various materials with rice grains.

Various rice dishes have been prepared with various flavoring materials, such as spices and other materials, being added to the rice during or after cooking of the rice. However, rice is a relatively hard and dense grain which does not readily pick up and hold flavoring materials on its surface, when it is in a dried condition.

It has been known to cook rice and to fortify gelatinized rice with various agents. However, it has not been known how to retain flavoring materials on the surface of individual rice grains and maintain these materials with the indivdiual grains when they are in the dried condition. Generally, the flavoring material abrades off of the rice in handling and/or storage and settles or sifts to the bottom of the package. As a consequence, it has not been possible, heretofore, to prepare and market a flavored dried rice product in a package, with the flavoring material uniformly dispersed throughout the rice.

Various attempts have been made to solve the problem and among these have been the application of "sticking" agents, such as zein edible oil, shellac or gluten to the rice grains, to cause the flavoring materials to adhere to the surface of the individual grains. However, these attempts have not resulted in a particularly satisfactory product and separation of the flavoring material has occurred in the packages with separation and sifting down of the flavoring material in the package during handling, shipping and storage. Furthermore, the presence of such sticking agents tends to cause difficulty in the satisfactory storage of the rice product and these agents may go off in flavor more rapidly than either the rice or the flavoring material. Certain of these agents are not desirable food additives, or are desirably avoided on the rice grains.

Rice is known to be packaged with encapsulated flavoring materials. On cooking, the capsules dissolve or melt, thereby releasing the flavor. However, this does not give best results with certain flavoring materials and necessitates the use of other forms of these materials. In addition, pre-proportioning of the rice is required, when capsules are used.

In certain markets, it has been considered desirable to improve the appearance of rice grains and, to this end, the rice grains have been coated with various materials, including talc. The use of non-edible coatings is, of course, desirable avoided and effecting improvement of the appearance of rice grains with surface treatment with edible materials is a recognized need.

A principal object of the present invention is the provision of an improved rice. Another object is the provision of rice grains having an improved coating thereon. A further object of the present invention is to provide an improved method for uniformly applying coating materials to rice. A still further object of the invention is to provide a uniformly coated rice from which the coating material is not readily separated. A more particular object of the invention is the provision of an improved dry rice product coated with flavoring material. Still further objects and advantages of the invention will become apparent from the following disclosure.

The process of this invention contemplates the use of a dried rice to which a limited amount of moisture is added to pre-condition the surface of the grains. After a proper surface condition is established, relatively dry coating materials are mixed with the rice grains. The term "dry," as used herein, means that the coating material is substantially free from moisture but the coating material may comprise flavor materials.

In accord with this invention, the rice is not necessarily subjected to conditions which cause an increase in gelatinization of the dried rice during such pre-conditioning or mixing and, in this connection, the combining of the rice and coating materials can be carried out at ambient temperatures. After combining of the rice and coating material, the coated rice is dried in any of several ways to provide a product having a moisture content less than the equilibrium moisture for rice, i.e., less than about 13 percent. After drying, the coating material is bound to the surface and does not abrade off and sift down through the rice on shipment or storage. Furthermore, the coating material is uniformly distributed over the rice grains so as to provide uniformity in the desired flavoring or appearance of the rice grains.

The rice utilized in the preparation of the flavored rice of this invention may be raw milled rice, parboiled rice, converted rice, or rice treated by various known processes to give a dried quick cooking rice. Thus, the rice starch may or may not be gelatinized when utilized in the preparation of the product of the invention. Better results are attained when the surface of the rice grains are at least partially gelatinized prior to applying the coating materials and particularly good results are achieved with parboiled rice. Any of the various varieties of rice may be utilized which are conventional in the commercial market, such as the Texas Patna, Blue Bonnet, Nato, Calrose, and Belle Patna varieties.

Rice, like other cereal grains, achieves an equilibrium moisture, when stored under ambient conditions. This will vary somewhat with these conditions.

When the rice being treated contains this equilibrium moisture, it has been found that the moisture added to pre-condition the surface of the grains should be from about 5 percent to about 20 percent of the weight of the rice under treatment. If lesser amounts of moisture are used, it has been found that there is not sufficient surface conditioning of the rice, and if significantly higher amounts of moisture are used, sticking and unsatisfactory conditioning of the rice grains results.

The moisture which is added is desirably added at ambient temperatures. However, when raw rice is employed in the practice of this invention, the wetted rice may be heated with steam, or otherwise, to provide surface gelatinization of the rice grains. However, such heating should be limited so as to inhibit sticking together of the grains.

The rice grains with this pre-conditioned surface, in accord with the invention, are then mixed with a dry coating material, such as spices, salts, sugars, or the like. Mixing of the dry coating material and the moistened rice is carried out to effect uniform distribution of the coating material over the surface of the rice. We have found that the rice will pick up to about 30 percent, based on the weight of the moistened rice, of the coating material. When flavoring materials are used as the coating material, they will comprise at least about 5 percent of the weight of the moistened rice, but other coating materials used to improve appearance or to fortify the rice may be used at lower levels. A wide number of dry flavoring materials have been found to be satisfactory for coating rice and, in this connection, various spices, such as curry powder, cinnamon, peppers, cumin, fenugreek, coriander, onion, mustard, etc.; sugars, including sucrose and dextrose; and salts, can be used. Also various known food nutrients can be added.

Some of the moisture may be added after the mixing of the flavoring material with the rice and, in this connection, about two-thirds or more of the moisture may be used to pre-condition the surface of the rice prior to mixing with flavoring material and the remainder of the moisture added after mixing with flavoring material. This later addition of moisture is highly desirable to assure proper surface conditioning of the rice grains after coating.

The moistened and coated rice is then dried to about its equilibrium moisture level or lower. Drying will normally be effected in conventional drying apparatus in the usual manner. The rice, if dried below its equilibrium moisture level, is desirably hermetically packaged to avoid moisture pick up. If the rice is not to be so packed, then it need only be dried to about the level of its equilibrium moisture content. Under ambient conditions, the equilibrium moisture level for the rice grains will be about 13 percent.

The dried flavored rice is packaged in a container which may be a flexible or rigid container and used for cooking various rice dishes. It has been found that in shipping and storage, there is very little separation of the coating materials from the rice, whereas in those cases where the flavoring material has been applied to the rice by means of a sticking agent, specifically, vegetable oil, the flavoring materials separated from the rice grains and sifted to the bottom of the container under shipping conditions.

Not only does the coating material adhere firmly to the rice grains, but we have found that the rice has a high gloss and a very salable appearance.

The exact manner in which the flavoring material combines with rice grains processed in accordance with this invention is not altogether known. It does appear, however, that the coating materials form a part of the surface of the rice and permeate the rice grains to a limited degree. As indicated, the attachment is sufficiently strong to prevent separation of the flavoring material from the rice under handling, shipping and storage conditions.

Example I

As a first example of this invention, 37.5 pounds of milled, long grain parboiled rice, having a moisture content of 10.65 percent, was mixed with about 5 pounds of tap water in a stainless steel tumbler. Mixing was continued for five minutes, whereupon about 12.5 pounds of a flavoring mixture known as "Jambalaya" was added to the wetted rice in the tumbler. This spice mixture is a commercially available product and contains dried mushrooms and dehydrated peppers in readily visible pieces. The flavoring mixture was mixed with the pre-conditioned rice for ten minutes. Thereafter, about 0.5 pound of additional water was added to the mixture, and mixing was continued for an additional twenty minutes.

The moist flavored rice was removed from the tumbler and placed in a rotary dryer provided with forced air heat, the air being heated by steam heating coils to a temperature of about 220 degrees F. The product was dried over a period of 15 minutes and had an end moisture content of 11 percent. The product was placed in a sealed container.

The product was made into a cooked flavored rice by bringing 1½ cups of water to a boil and adding 5 ounces of the flavored rice to the boiling water with one tablespoon of margarine. Boiling was continued for one minute with occasional stirring. A cover was placed on the rice and the rice was allowed to simmer slowly for 25 minutes. When served, the rice was deliciously and uniformly flavored.

The flavored rice, in a flexible package, did not show any separation of the flavoring material on shipping and storage. Furthermore, when the rice was shaken for one hour, which is considered equivalent to shipping for 2,400 miles by truck, there was no particular separation and sifting down of the flavoring materials.

Example II

As a second example of the invention, 880 grams of milled, long grain parboiled rice, having a moisture level of about 11 percent, was placed in a twin shell blender and 105 grams of tap water was poured over the rice. The product was mixed with the water for 5 minutes, whereupon 120 grams of a curry spice mix was added. The curry spice mix comprised the following:

| | weight/grams |
|---|---|
| Salt | 64.54 |
| Dehydrated chopped onion | 60.00 |
| Curry powder | 31.50 |
| Dextrose | 22.00 |
| MSG | 14.56 |
| Fat | 5.40 |
| | 198.00 |

After 10 minutes of mixing, 35 grams of water was added and mixing was continued for an additional 20 minutes. The rice was dried in a Proctor and Schwartz dryer using 150 degrees F. air in about two hours. The final moisture content was about 10 percent. The product was placed in a polyethylene bag. There was not any noticeable separation of the flavoring material under shipping and storage conditions. The rice grains had a high gloss and a highly improved appearance.

Example III

As a third example of the invention, 880 grams of milled, long grain parboiled rice was mixed with 100 grams of tap water for a period of 10 minutes. The pre-conditioned rice was then coated with the following flavoring material in the indicated amounts:

| | Grams |
|---|---|
| Sucrose | 72 |
| Salt | 41 |
| MSG | 4.2 |
| Encapsulated onion flavor | 1.04 |
| Encapsulated garlic flavor | .24 |
| Black pepper | .24 |
| | 118.72 |

The flavoring material and pre-conditioned rice were mixed for 5 minutes and 35 grams of tap water was added. Mixing was continued for an additional 5 minutes. Drying was effected by spreading the rice out on a tray and allowing the moisture to evaporate under ambient conditions. The flavoring material had a glossy appearance and was tightly bound to the rice grains.

It will be seen from the foregoing that a new and novel process has been provided for improving rice. The process provides means for tightly bonding coating materials to rice and for providing rice having improved appearance.

The various features of the invention which are believed to be new are set forth in the following claims.

What is claimed is:

1. A process for coating rice comprising the steps of forming a moistened surface of gelatinized rice on dry grains of rice having an equilibrium level of moisture or lower, said moistened surface being provided by adding water to the rice so as to increase the moisture level of the rice by from about 5 percent to about 20 percent of the weight of the rice, said increase in moisture level occurring primarily at the surface of the grains, mixing a substantially dry coating material with the moistened rice, and drying the rice.

2. A process for coating rice comprising the steps of forming a moistened surface of gelatinized rice on dry grains of rice, said moistened surface being provided by adding water to the rice so as to increase the moisture level of the rice by from about 5 percent to about 20 percent by weight of the rice, said increase in moisture level occurring primarily at the surface of the grains, mixing a substantially dry coating material with the moistened rice, at least about two-thirds of the water being added before mixing of the coating material and not more than about one-third of the water being added after said mixing, and drying the rice.

3. A process for coating milled, long grain, parboiled rice comprising the steps of forming a moistened surface of gelatinized rice on dry grains of rice, said moistened surface being provided by adding water to the rice so as to increase the moisture level of the rice by from about 5 percent to about 20 percent of the weight of the rice, said increase in moisture level occurring primarily at the surface of the grains, mixing a substantially dry coating material with the moistened rice, at least about two-thirds of the water being added before mixing of the coating material and not more than about one-third of the water being added after said mixing, and drying the rice.

4. A process for coating raw rice comprising the steps of moistening the surface of the rice grains by adding water at a level of from about five percent to about twenty percent by weight of the rice, maintaining said added water in the surface region of the grains, gelatinizing the surface of the rice grains by heating the surface, said gelatinization being insufficient to cause sticking of the rice grains, mixing a substantially dry coating material with the gelatinized rice while moist and drying the rice to at least about the equilibrium moisture level for the rice.

5. A process for coating raw rice comprising the steps of providing a level of from about five percent to about twenty percent of water by weight of the rice, substantially maintaining the water at the surface of the rice grains, gelatinizing the surface of the rice grains by heating the surface with steam, said gelatinization being insufficient to cause sticking of the rice grains, mixing a substantially dry coating material with the gelatinized rice while moist and drying the rice to at least about the equilibrium moisture level for the rice.

6. A process for coating rice comprising the steps of mixing dry rice grains with water, said water being added at a level of from about five percent to about 20 percent by weight of the rice, said mixing occurring for a period of time sufficient to permit said rice grains to absorb said water, thereby placing the surface of said rice grains in a condition for receiving a coating material, adding a substantially dry coating material to said moistened rice, mixing said moistened rice and said coating material for a period of time sufficient to coat said moistened rice with said coating material and drying the rice to provide a uniformly coated rice product from which the coating material does not readily separate.

7. A process for coating rice comprising the steps of mixing dry rice grains with water, said water being added at a level of from about five percent to about 20 percent by weight of the rice, said mixing occurring for a period of time sufficient to permit said rice grains to absorb said water, thereby placing the surface of said rice grains in a condition for receiving a coating material, adding a substantially dry coating material to said moistened rice, mixing said moistened rice and said coating material for a period of time sufficient to coat said moistened rice with coating material, and drying the rice to the equilibrium moisture level or lower so as to provide a uniformly coated rice product from which the coated material does not readily separate.

8. A process for coating rice comprising the steps of mixing dry rice grains with water, said water being added at a level of from about five percent to about 20 percent by weight of the rice, said mixing occurring for a period of time sufficient to permit said rice grains to absorb said water, thereby placing the surface of said rice grains in a condition for receiving a coating material, adding a substantially dry coating material to said moistened rice, mixing said moistened rice and said coating material for a period of time sufficient to coat said moistened rice with said coating material, at least about two-thirds of said water being added before mixing of the coating material with said rice grains and not more than about one-third of the water being added after mixing, and drying the rice to provide a uniformly coated rice product from which the coated material does not readily separate.

9. A process for coating rice comprising the steps of mixing dry rice grains with water, said water being added at a level of from about five percent to about 20 percent by weight of the rice, said mixing occurring for a period of time sufficient to permit said rice grains to absorb said water, thereby placing the surface of said rice grains in a condition for receiving a coating material, adding a substantially dry coating material to said moistened rice, mixing said moistened rice and said coating material for a period of time sufficient to coat said moistened rice with said coating material, said coating material being added up to a level of about 30 percent by weight of the moistened rice and drying the rice to provide a uniformly coated rice product from which the coating material does not readily separate.

References Cited
UNITED STATES PATENTS

| | | | |
|---|---|---|---|
| 2,824,009 | 2/1958 | Lindow | 99—83 X |
| 2,893,332 | 7/1959 | Roser et al. | |
| 2,937,946 | 5/1960 | Ozai Durrani | 99—80 |
| 3,157,514 | 11/1964 | Gorozpe | 99—80 |

FOREIGN PATENTS

| | | |
|---|---|---|
| 804,923 | 11/1958 | Great Britain. |

RAYMOND N. JONES, *Primary Examiner.*